(12) United States Patent
Knorr

(10) Patent No.: US 8,738,444 B2
(45) Date of Patent: May 27, 2014

(54) SPATIAL MARKETPLACE SYSTEM

(75) Inventor: John Knorr, Traralgon (AU)

(73) Assignee: Super Internet Site System Pty Ltd., Victoria (AU)

( * ) Notice: Subject to any disclaimer, the term of this patent is extended or adjusted under 35 U.S.C. 154(b) by 91 days.

(21) Appl. No.: 12/659,929

(22) Filed: Mar. 25, 2010

(65) Prior Publication Data

US 2010/0191597 A1 Jul. 29, 2010

Related U.S. Application Data

(63) Continuation of application No. 10/542,380, filed as application No. PCT/AU2004/000054 on Jan. 15, 2004, now abandoned.

(51) Int. Cl.
*G06Q 30/00* (2012.01)
*G06F 15/16* (2006.01)

(52) U.S. Cl.
USPC .............. 705/14.71; 705/14.56; 709/206

(58) Field of Classification Search
USPC ............ 705/14.36, 14.56, 14.73; 707/769, 707/E17.014; 709/206; 715/810
See application file for complete search history.

(56) References Cited

U.S. PATENT DOCUMENTS

| | | | |
|---|---|---|---|
| 5,930,764 A | | 7/1999 | Melchione et al. |
| 6,029,141 A | * | 2/2000 | Bezos et al. ............ 705/27.1 |
| 7,343,317 B2 | | 3/2008 | Jokinen et al. |
| 7,466,988 B2 | | 12/2008 | Koskinen et al. |
| 2001/0039489 A1 | | 11/2001 | Ford et al. |
| 2002/0095333 A1 | * | 7/2002 | Jokinen et al. .......... 705/14 |
| 2003/0004743 A1 | | 1/2003 | Callegari |

FOREIGN PATENT DOCUMENTS

| | | |
|---|---|---|
| CA | 2 351 810 A1 | 12/2002 |
| WO | WO 01/25993 A1 | 4/2001 |
| WO | WO 01/41017 A1 | 6/2001 |
| WO | WO 01/46774 A2 | 6/2001 |
| WO | WO 01/54021 A1 | 7/2001 |
| WO | WO 01/65426 A1 | 9/2001 |

* cited by examiner

*Primary Examiner* — Sun Li
(74) *Attorney, Agent, or Firm* — Oliff PLC

(57) ABSTRACT

A method of managing the delivery of offers from suppliers to members via a spatial marketplace system involves registering potential customers as members of the spatial marketplace system by recording their names and contact details in a database. A spatial identifier is assigned to each database record, the spatial identifier being sourced from the contact details supplied during a registration process. Each member nominates one or more attributes corresponding to a commodity in relation to which the member is interested in receiving offers. Each supplier defines a geographic region in which the supplier wishes to do business and nominates one or more attributes corresponding to commodities, which the supplier wishes to sell. A spatial identifier location algorithm is used to identify the database records with spatial identifiers located within the geographical region defined by the supplier. Delivery of offers from a supplier is restricted to members associated with the identified database records which have nominated attributes matching the attributes nominated by the supplier.

9 Claims, 5 Drawing Sheets

SPATIAL MARKETPLACE SYSTEM

This is a Continuation of application Ser. No. 10/542,380 filed Aug. 5, 2005, which in turn is a National Phase Application of PCT/AU04/00054 filed Jan. 15, 2004. The disclosure of the prior applications is hereby incorporated by reference herein in its entirety.

BACKGROUND

1. Field of Invention

This invention relates to the spatially targeted delivery of offers from suppliers to potential customers. It relates particularly but not exclusively to a method and system for managing the delivery of offers in response to requests for offers made by potential customers which are members of a spatial marketplace system.

2. Background of the Invention

Conventional marketing methods, which entail the distribution of promotional materials, generally involve a haphazard approach to determining the sector of the community to be targeted by a particular promotion. Advertising campaigns that rely on classified advertisements in newspapers and the placement of advertisements in magazines and periodicals are constrained in their geographic extent by predefined distribution routes and channels over which the advertiser has no control.

Undoubtedly, in many cases advertisers inadvertently market goods and services to individuals and households, which do not even reside in the same state or city where the advertised goods and services are offered. Whilst this is not an issue for businesses dealing in products that have universal appeal and are easily and inexpensively dispatched by mail such as books or CDs, it is a major problem for businesses that are inherently reliant on a local client base due to the nature of the goods offered, in the case of a hardware store for example, or because the business provides locally based services such as a take away food outlet.

The use of alternative advertising media such as catalogues distributed via mail drops and telemarketing, offers the advertiser a greater degree of control over the geographic extent of the distribution of promotional materials. However, the problem remains, that a large proportion of groups and individuals who are targeted in the random distribution of marketing materials, have little or no interest in the products or services on offer and are unlikely to turn out to be prospective customers.

The introduction of the Internet has revolutionised the manner in which business is conducted. The Internet enables users to browse and access information regarding products and services and electronically place orders to purchase the same, without any geographic restrictions. Due to rapid growth in the popularity of the Internet as a means of communication, the use of the Internet as a marketing tool has also gained prevalence.

The Internet makes it possible to transmit large quantities of information to a large number of people in a short time. These capabilities, combined with the low cost of communications over the Internet, make the Internet an attractive medium for advertisers. Electronic marketing via the Internet provides rapid and economical access to large numbers of prospective customers. However, a notable disadvantage of the Internet is that it does not provide a means for effectively identifying and targeting local customers and therefore does not provide a suitable marketing opportunity for businesses relying on a local customer base for trade.

Some examples of forms of electronic advertising via the Internet include distribution of unsolicited commercial emails (otherwise known as spam) and pop-up advertisements or website banner advertisements which appear on unrelated websites and usually have a direct link to the advertiser's website. The recipients of such advertising messages are not specifically targeted. In the case of website banner advertising, any individual viewing a particular website will be targeted by the promotion. For Internet users, these forms of unsolicited advertising are a constant source of annoyance and are usually simply ignored. For these reasons, the success rate of electronic marketing in this form is doubtful.

The randomized distribution of promotional material causes a high level of inefficiency at a significant cost to the advertiser. Advertisers are not able to successfully identify and target those sectors of the community that are most likely to respond to specific promotions. In addition, individuals and households have no influence over the advertising materials that they receive and may become exasperated at the amount of unsolicited junk mail delivered to them.

The discussion of the background to the invention included herein is included to explain the context of the invention. This is not to be taken as an admission that any of the material referred to was published, known or part of the common general knowledge as at the priority date of the claims.

SUMMARY

According to a first aspect of the present invention, there is provided a method of managing the delivery of offers from suppliers to members via a spatial marketplace system including the steps of:

(a) registering potential customers as members of the spatial marketplace system by recording their names and contact details in a database;

(b) assigning a spatial identifier to each database record, the spatial identifier being sourced from the contact details supplied during a registration process;

(c) each member nominating one or more attributes corresponding to a commodity in relation to which the member is interested in receiving offers;

(d) each supplier defining a geographic region in which the supplier wishes to do business and nominating one or more attributes corresponding to commodities which the supplier wishes to sell;

(e) using a spatial identifier location algorithm to identify the database records with spatial identifiers located within the geographical region defined by the supplier;

wherein delivery of offers from a supplier is restricted to members associated with the identified database records which have nominated attributes matching the attributes nominated by the supplier.

It is to be understood that a supplier may be any business or supplier wishing to promote or sell commodities. A potential customer having may be any individual, a household or a business wishing to buy or find out more about one or more commodities. Potential customers having their details registered in the database may be referred to as members. A commodity may be any good or service which is promoted or offered for sale using the system.

In a preferred form, each supplier is advised of the number of identified database records associated with nominated attributes matching the attributes nominated by the supplier and the cost of delivering offers to members associated with each of those database records, wherein the supplier either agrees to deliver offers to each of the members thereby incurring the cost, or modifies the geographical region to increase or decrease the number of offers to be delivered.

In one embodiment of the invention, each database record is accompanied by details of memberships to a third party organisation, wherein the third party organisation receives a percentage of revenue form the spatial marketplace system in return for introducing their members to the system.

In another form of the invention, the supplier associates a numeric qualifier or range of numeric qualifiers with one or more attributes, wherein the delivery of offers is further restricted to members which have nominated a numeric qualifier for the relevant attribute which matches or falls within the range of the numeric qualifiers nominated by the supplier. This allows suppliers to selectively respond only to requests for offers from members which specify a quantity, size, length or the like that matches criteria nominated by the supplier.

In yet another form of the invention, the member nominates a preferred settlement or payment option selected from a menu provided by the system, wherein the delivery of offers is further restricted to members which have nominated a settlement or payment option which matches the settlement or payment options utilised by the supplier. Examples of settlement or payment options may include credit card, cash, cheque, bank cheque, credit card or specific types of credit card such as American Express™, VISA™, MASTERCARD™ or any combination thereof. This enables buyers (members) to be matched with sellers (suppliers) offering their preferred settlement or payment options.

In one arrangement, the member nominates a point in time and a time interval when a request for offers will be presented to suppliers.

Preferably, the member nominates a mode via which the offers will be delivered from the supplier to the member. More preferably, the mode via which the offers will be delivered from the supplier to the member is selected from one or more of the following:
(a) via a member's system control panel;
(b) via the member's email;
(c) via a nominated third party email;
(d) via telephone;
(e) via short message service (SMS); or
(f) via post.

A member's system control panel is preferably viewed via an Internet browser. However, it is to be understood that offers may be delivered to members by any suitable means including delivery via facsimile message.

In one embodiment of the invention, the geographical region is an area within a distance from one or more geographical points nominated by the supplier.

In another embodiment of the invention, the geographical region is an area displayed on a map presented to the supplier on an interface, whereby modification of the area displayed on the map results in a corresponding modification in the geographical region.

Each attribute corresponding to a commodity may be defined by at least four levels, each consecutive level providing a refinement to a description of the commodity.

According to a second aspect of the present invention, there is provided a spatial marketplace system for managing the delivery of offers from suppliers to members, including:
(a) a database recording the names of the members;
(b) means for assigning a spatial identifier to each database record, the spatial identifier being sourced from information supplied during a registration process;
(c) means for associating each record with one or more attributes corresponding to a commodity in relation to which the member is interested in receiving offers;
(d) geographical region selection means by which the supplier selects a geographical region in which the offers are to be delivered;
(e) a spatial identifier location algorithm for identifying the database records with spatial identifiers located within the selected geographical region; and
(f) delivery means for delivering the offers to members associated with the identified database records which have nominated attributes matching the attributes nominated by the supplier.

In one embodiment the system includes means for accompanying each database record by details of memberships to third party organisations, wherein the third party organisation receives a percentage of revenue form the spatial marketplace system in return for introducing their members to the system.

In another embodiment the system includes means for the supplier to associate a numeric qualifier or range of numeric qualifiers with one or more attributes, wherein the delivery of offers is further restricted to members which have nominated a numeric qualifier for the relevant attribute which matches or falls within the range of the numeric qualifiers nominated by the supplier.

Preferably, the system includes means for nominating a preferred settlement or payment option selected from a menu provided by the system, wherein the delivery of offers is further restricted to members which have nominated a settlement or payment option which matches the settlement or payment options utilised by the supplier.

In one form of the invention, the system including means for nominating a point in time and a time interval when a member's request for offers will be presented to suppliers.

Preferably, the system includes means for nominating a mode via which the offers will be delivered from the supplier to the member. More preferably, the mode via which the offers will be delivered from the supplier to the member is selected from one or more of the following:
(a) via a member's system control panel;
(b) via the member's email;
(c) via a nominated third party email;
(d) via telephone;
(e) via short message service (SMS); or
(f) via post.

In an embodiment of the invention, the geographical region selection means define an area within a distance from one or more geographical points nominated by the supplier.

In another form, the geographical region selection means defines an area displayed on a map presented to the supplier on an interface, whereby modification of the area displayed on the map results in a corresponding modification in the geographical region.

In a preferred form of the invention, the system generates automated offers on behalf of suppliers in response to requests for offers from members.

Preferably, each attribute corresponding to a commodity is defined by at least four levels, each consecutive level providing a refinement to a description of the commodity.

In one arrangement, an attribute database is associated with the system, the attribute database including the commodities to be offered using the system and a corresponding unique attribute identifier which describes or relates to each of the goods or services.

According to a third aspect of the present invention, there is provided a method of establishing a database of potential customers for the delivery of offers, the method including the following steps:

(a) organisations maintaining a membership database introduce their members to a spatial marketplace system as members in return for a percentage of revenue;
(b) members are offered an incentive in exchange for registering, providing a spatial identifier, nominating attributes corresponding to commodities in relation to which the member consents to receiving offers; and
(c) suppliers are granted access to a register of members which are categorised according to their spatial identifiers and attribute profiles;

thereby enabling advertisers to target members whose spatial identifiers and attribute profiles correspond to criteria predetermined by the supplier.

Preferably, access to the register of members is granted to the supplier by advising the supplier of the number of members associated with a spatial identifier and an attribute profile matching the suppliers criteria and the cost of delivering offers to those members, wherein the supplier either agrees to deliver offers to each of those members thereby incurring the cost, or alternatively, the supplier modifies the criteria to increase or decrease the number of offers to be delivered.

In one form of the invention, the incentive offered to members is use of a personal website.

BRIEF DESCRIPTION OF THE DRAWINGS

The invention will hereinafter be described in greater detail with reference to the attached drawings, which show example forms of the invention. It is to be understood that the particularity of the drawings does not supersede the generality of the preceding description of the invention.

DETAILED DESCRIPTION OF EMBODIMENTS

Figure 1:
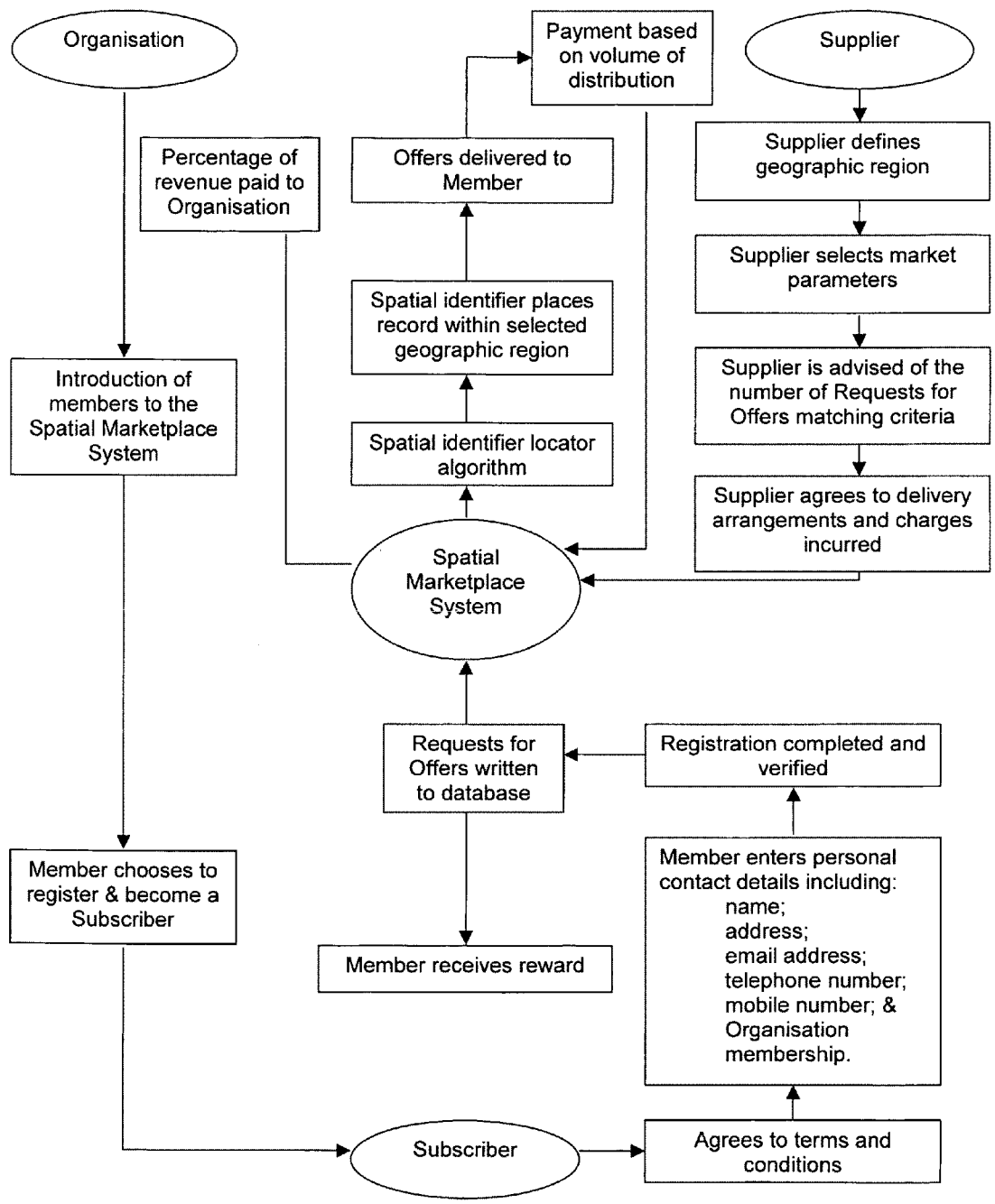
FIG. 1 is a flowchart illustrating how the delivery of offers can be managed according to a first embodiment of the invention.
Figure 2A:
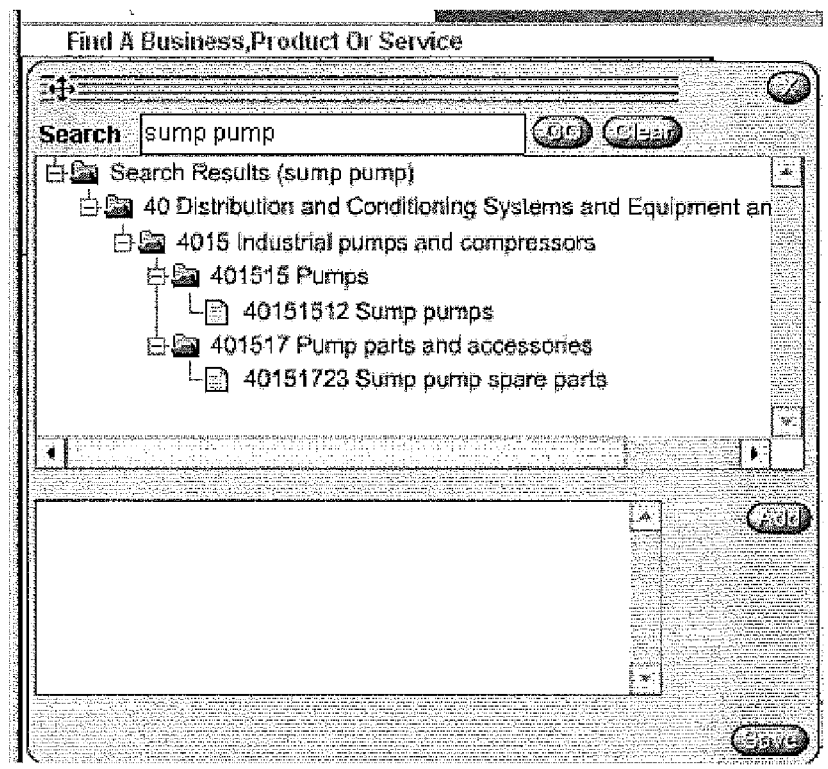
FIGS. 2a, 2b, 2c, 2d and 2e are screen captures showing examples of consecutive levels of attributes used to accurately define a commodity.
Figure 2B:
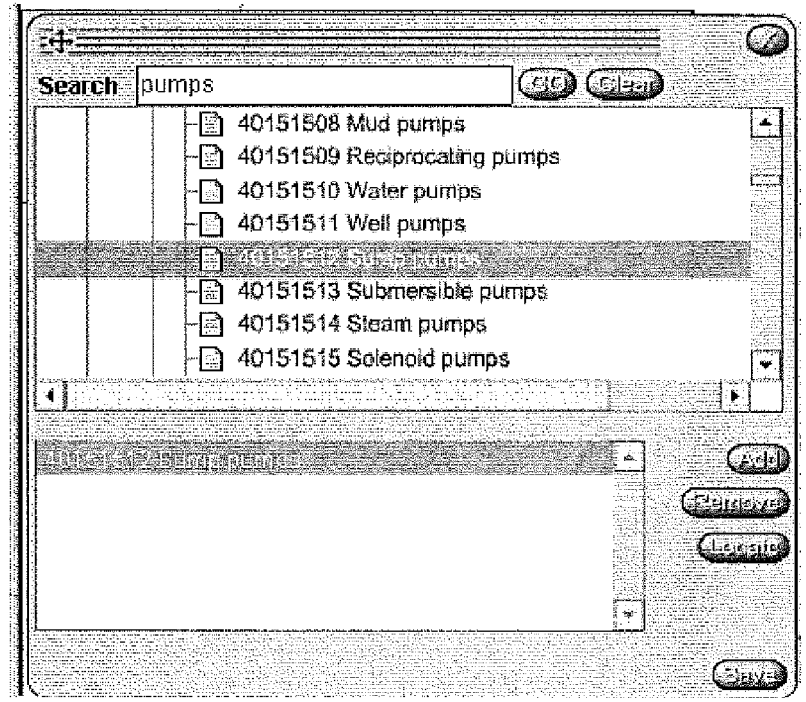
Figure 2C:
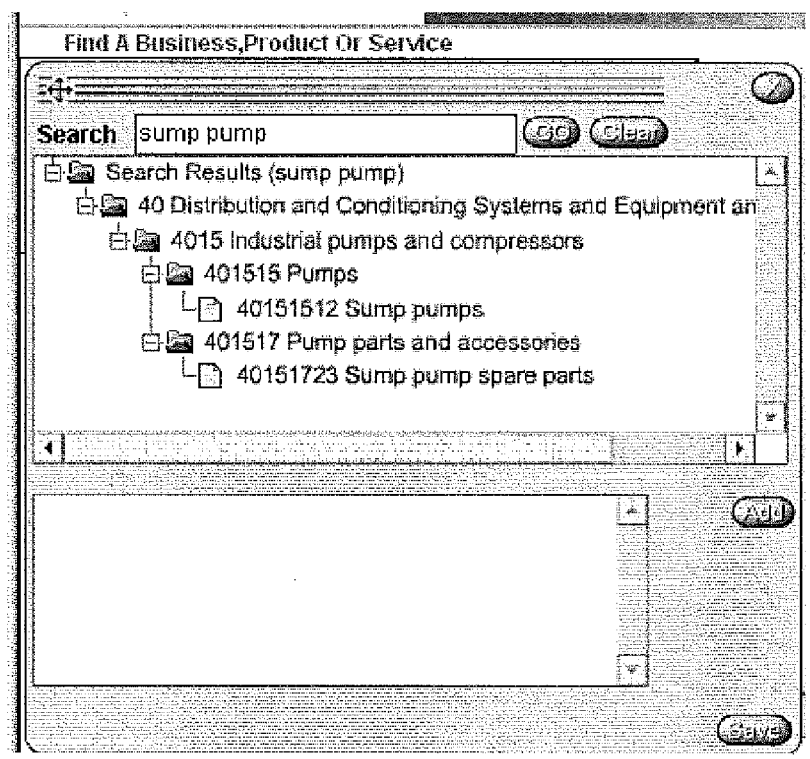
Figure 2D:
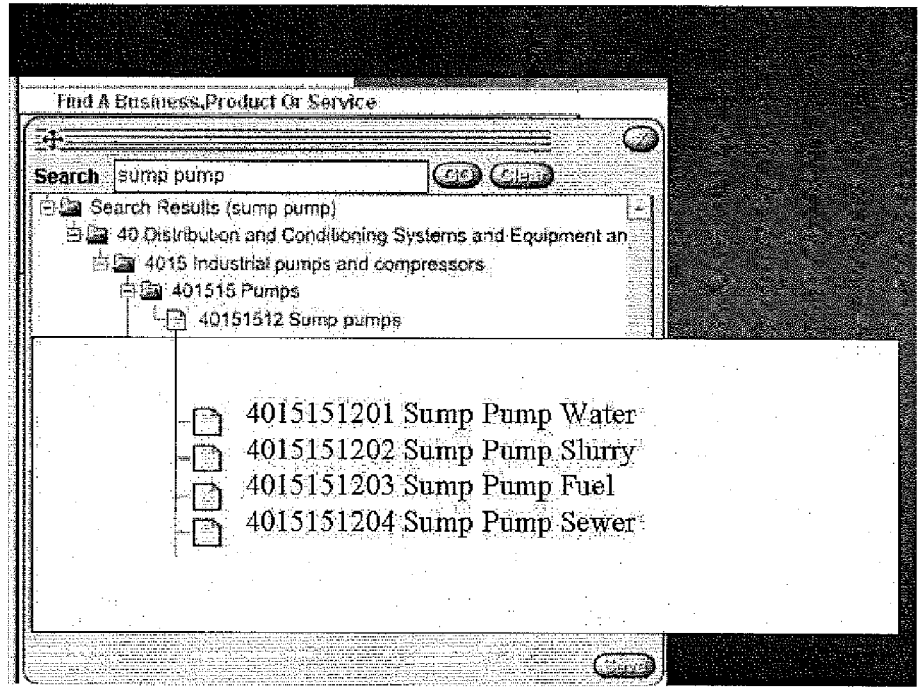
Figure 2E:
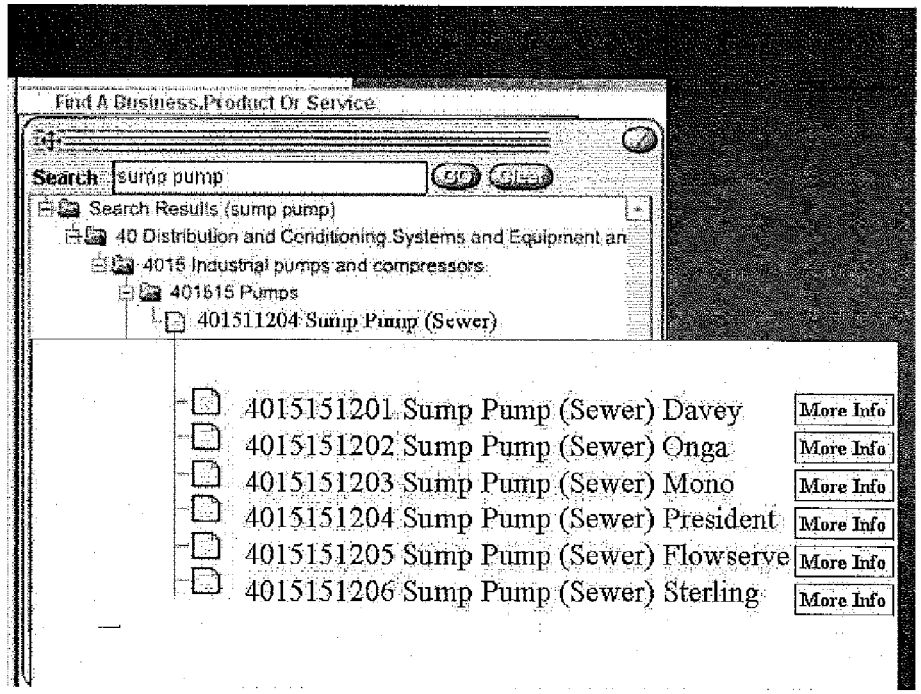

An overview of a spatial marketplace system according to one embodiment of the invention can be understood by working through the method of managing the delivery of offers as illustrated in FIG. 1.

An organisation which maintains a membership database or similar as part of its operations, promotes the spatial marketplace system to their members in exchange for a percentage of revenue raised by the spatial market place system through advertising in the form of delivery of offers to members. By participating in the program, organisations such as sporting clubs, professional organisations and community groups, are provided with an ongoing sponsorship revenue medium.

Members are encouraged to participate in the scheme by the offer of incentives in the form of financial benefits for their professional organisation or local community group, in addition to individual rewards offered to a member upon registration. In order for members to become eligible to receive the designated reward, in addition to providing personal contact details a minimum number of attributes corresponding to commodities in relation to which the member consents to receiving offers including promotional offers and marketing material, must be elected. Preferably, the incentive offered to the individual or household as a reward for registering as a member to the spatial marketplace system, is access to a website development tool enabling the reward recipient to create their own personal website.

Once a potential customer chooses to register with the spatial marketplace system as a member, the potential customer is prompted to enter personal contact details such as a name, address, email address, telephone number and mobile telephone number. It is envisaged that the registration process and entering of contact details takes place via an Internet website.

As a requirement of the registration process, the member whether it be an individual, household or business, must supply contact details including a physical address. This address is used to derive a spatial identifier which is stored in the database. The spatial identifier may comprise a set of coordinates, defining a precise point of latitude and longitude where the individual, household resides or where the business is located. The coordinates may define a three dimensional location.

In addition to entering contact details, in order to be eligible for an individual reward, the member must nominate one or more attributes corresponding to a commodity in relation to which the member is interested in receiving offers. This may be referred to as a request for offers from suppliers. Completion of the request for offers may be effected by selecting one or more check boxes from a menu that correspond to attributes corresponding to commodities, i.e. goods and/or services being of interest to the member. The member may be interested in purchasing a commodity or may simply be interested in learning more about them. In addition to corresponding to particular interests of the member specified in a request for offer, selected attributes may relate to commodities in relation to which the member consents to receiving information regarding promotions or special offers.

It will be apparent that the ability of members to post requests for offers to multiple suppliers offers a time saving and efficient method for the member to gather information and identify suppliers from who the member may wish to purchase goods or services.

Some examples of attributes which could be used to build a request for offer include but are not limited to:
Motor cars
Restaurants
Fishing
Travel
Computers
Sport
Movie offers
Investment opportunities
Wine
Music Each major attribute category may be divided into attribute subcategories that more clearly define the commodity of interest. For example:
Music
   Classical
   Jazz
   Rock
   Pop
   Swing
   Big band
   Country
   Blue grass Selection of attribute subcategories, preferably via a menu, provides a more accurate definition of the commodities of interest to a member. Attributes are preferably defined by numbers or codes, to prevent problems caused by misspellings and discrepancies in interpretation. Every commodity offered via the spatial marketplace system has a unique attribute code to enable more accurate requests for offers to be assembled and for more accurately targeted delivery of offers from suppliers to members. Members can search attribute codes using key words or access a pull down menu as required.

FIGS. 2a, 2b, 2c, 2d and 2e show how each unique attribute is defined by a number of levels. Each consecutive level provides a refinement to the description of the commodity requested or offered.

Once the member is satisfied with the selection of attributes, the request for offer is submitted to the spatial marketplace system to be written to the database in association with the member's personal contact details and a corresponding spatial identifier. In submitting a request for offers indicating commodities of interest, the member consents to receiving promotional material and special offers relating to his or her interests.

It is intended that a member will be able to edit their request for offers at any time, even once the registration process is complete. Editing will preferably take place via an Internet browser connected to the website. The editing facility allows members to amend their request for offers if they lose interest in a particular type of commodity or develop a new interest.

The use of the requests for offers to target potential customers who have interests relating to commodities offered in a particular promotion, means that members will only receive promotional offers which are likely to appeal to them. This reduces the amount of unsolicited "junk mail" that many individuals, households and businesses have to deal with.

As an incentive for registering as a member to the spatial marketplace system, the member may be offered a reward. The member does not become eligible to receive the reward unless all pertinent details and a minimum number of attributes for the request for offers have been submitted as part of the registration process. Once the eligibility criteria are fulfilled, the member is provided with access to a website development tool to assist in creation of their own personal website. The website development tool enables the reward recipient to create their own personal website without need for any special skills to build, edit or maintain the website.

Suppliers are provided with access to the spatial marketplace system, preferably by means of an Internet browser connected to the website. The supplier defines a geographical region or business catchment area within which the supplier proposes to deliver promotional offers relating to a particular commodity.

Figures 3, 4:
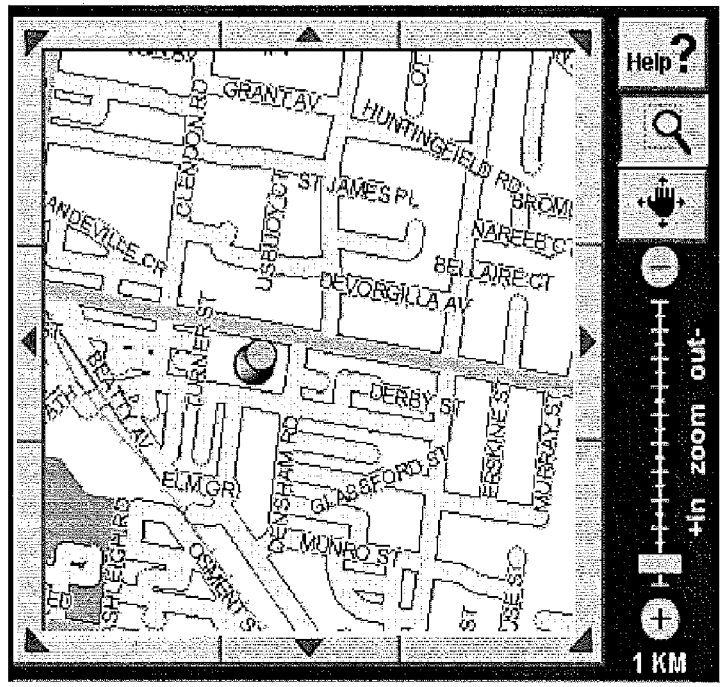
FIG. 3 is a map presented to the supplier via an interface to facilitate selection of the geographical region in which offers are to be delivered.
FIG. 4 is a form to be used by suppliers to register their details on the database.

The extent of the geographical region or business catchment area may be defined by reference to a specified distance from one or more specific geographical points. For example in defining a geographical region or business catchment area for a local pizza shop, delivery of offers could be limited to members located within 5 radial kilometers of the shop. Alternatively, suppliers may select the geographical region by simply selecting a town, suburb, postcode or municipality. Suppliers may also select the geographical region by reference to an area displayed on a map presented to the advertiser on an interface as shown in FIG. 3, whereby modification of the area displayed on the map results in a corresponding modification of the geographical region. Modification of the area displayed on the map may involve panning and or zooming the map window for example. The supplier is thereby able to restrict distribution of promotional offers to members who reside within the catchment area of the business offering the commodity and who are known to be interested in receiving such offers.

Once a geographical region within which the promotional material is to be distributed has been defined by the supplier, a spatial identifier location algorithm is employed to identify database records associated with spatial identifiers that are located within the specified geographical region. The spatial identifier is derived from the physical address of the individual or household, which is compulsory information to be provided in the registration process. Examples of spatial identifiers may comprise a set of coordinates, defining a precise point of latitude and longitude where the individual or household is located or a set of coordinates defining a three dimensional location on a grid.

The spatial identifier location algorithm may perform a variety of functions which can be modified according to user requirements. The various functions are based on mathematical computations. For instance, the spatial identifier location algorithm can be employed to identify database records associated with spatial identifiers, which are located within a nominated radial distance of a specified location. For example, the spatial identifier location algorithm could be used to isolate database records associated with a spatial identifier which falls within 10 kilometers of a garden supply centre positioned at a specified location (x,y). Alternatively, the spatial identifier algorithm may be used to identify database records related to a spatial identifier, which is located within the nominated radial distance, from any one of one or more specified locations. This variant of the spatial identifier algorithm could be useful, for example, in establishing a distribution route for material promoting one or more certain franchise outlets within a certain locality. As a further alternative, the spatial identifier algorithm could be used to identify database records linked to a spatial identifier, which defines a position within a nominated distance of a specified point in a specified direction. For example, the spatial identifier algorithm could be used to identify database records associated with spatial identifiers which are located within 2 kilometers east of a specified location.

The supplier is advised of the number of identified database records associated with nominated attributes matching the attributes nominated by the supplier and the cost of delivering offers to members associated with each of those database records. The supplier then has the option of authorising delivery of offers to those members by agreeing to incur the cost. Alternatively, the supplier may modify the geographical region to increase or decrease the number of offers to be delivered to members. If the supplier holds an account with the spatial marketplace system, the account is debited accordingly.

Moreover it is to be understood that according to a preferred embodiment of the invention, individual suppliers are not provided with data about members which post requests for offers, notwithstanding that suppliers may be provided with addresses or telephone numbers depending on the mode of delivery nominated by the member.

Therefore, the supplier targets the distribution of marketing material to qualified potential customers, that is, by restricting the distribution of marketing material to members whose requests for offers include attributes, which describe or relate to the commodities to be advertised. In so doing, the supplier limits the delivery of promotional offers to those members who are most likely to be interested in the commodities on offer, rendering the marketing process more efficient and cost effective.

In directing the delivery of offers in this manner, efficiency and success rate of the promotion is increased considerably since recipients of the offers have previously indicated that they are interested in receiving promotional material and special offers in relation to a certain types of commodities. That is, potential customers are qualified before offers are delivered to them. As a result, the likelihood of winning recipients of offers over as customers is significantly increased. Therefore, suppliers are not wasting money on delivering offers to individuals, households and businesses that are clearly not within their business catchment area or demographic.

The offers may be delivered via any one or more modes including email, mail, telephone, mobile telephone or a dedicated message delivery system but is not limited thereto. A dedicated message delivery system may involve sending an offer directly to a member's system control panel viewed via an Internet browser. Alternative means of delivering offers may for example include messaging the member's website, website banner advertising or facsimile transmission.

Suppliers pay a fee for use of the spatial marketplace system based on the number of offers delivered to members. A proportion of the revenue raised from advertising fees is distributed amongst the organisations or groups, which have successfully introduced their members to the spatial marketplace system and to whom offers have been distributed.

A supplier also has the option of combining requests for offer attributes with an organisation membership. For instance, a Holden Dealer can advertise to members, which are interested in a new motorcar and offer members of the Institute of Engineers a discount of $3000.00. Therefore the spatial marketplace system has enabled the supplier to further qualify prospects by including the prerequisite that members targeted by the promotion be members of the Institute of Engineers.

The spatial marketplace system enables members to post requests for offers relating to particular commodities. For instance, if a member were considering purchasing a new family sedan, a request for offer could be posted on the system seeking offers from suppliers of family sedans. If the member had a particular make and model of family sedan in mind, the request for offers could be restricted by selecting appropriate request for offer attributes to describe the particular make and model of family sedan required.

Furthermore, the member could request that the request for offers be posted by the system in one weeks time and indicate that the member is open to receiving offers form suppliers for a period of two weeks. The member may also nominate a preferred settlement or payment option selected from a menu provided by the spatial marketplace system so that the delivery of offers is restricted to offers from suppliers who offer settlement or payment via the members preferred option. For example, the member may only be interested in purchasing commodities from suppliers that accept American Express™.

Whilst it is to be understood that the system provides for suppliers to respond to requests for offers manually, in most cases it is more expedient for the spatial marketplace system to generate automated offers in response to requests for offers. Furthermore, suppliers can be notified when an extraordinary request for offer is detected, which the supplier may wish to respond to manually. For example, if a single request for offer requests an offer for 20 family sedans, suppliers may wish to assemble a special offer in order to obtain the business.

The supplier is also notified by the spatial marketplace how many requests for offers matching the suppliers criteria have been posted and what charges will be incurred by responding by delivery of an appropriate offer.

The spatial marketplace system offers a range of generic templates, which may be customised by individual suppliers, to enable them to build advertisements and offers quickly and without requirement for specialist skills.

The spatial marketplace system has considerable application for municipalities, which can register the residents of a municipality with the spatial marketplace system to enable spatially targeted delivery of all its corporate, service and emergency messages. For example, a particular message relating to library services could be delivered to all residents living within 2 kilometers of the municipal library. A message regarding pre school services could be delivered to families who use pre school services living within 3 kilometers of a new pre school. Residents likely to be affected by impending roadwork could be notified by a municipal message delivered to all residents living within 1 kilometer of the location of the roadwork. Revenue generated by the spatial marketplace system could be used to fund community projects.

Residents may filter messages received from their municipality by selecting or deselecting particular attributes. For instance, a resident may choose to receive municipal messages relating to roadwork, waste management, and town planning matters, but block messages concerning child care and local arts programs.

The spatial marketplace system also has application for presenting offers for commodities from suppliers to businesses and for businesses to request such offers from suppliers.

Businesses may register with the spatial marketplace system as a member wishing to make requests for offers, or as a supplier wishing to deliver offers to potential customers, that is as a supplier, or both.

An advertising agency or industry organisation or the like which maintains a membership database or similar as part of its operations, may promote the spatial marketplace system to their members. In exchange for introducing members to the spatial marketplace system, the agency or organisation receives a percentage of revenue raised by the spatial marketplace system through advertising.

The members must register contact details as part of the registration process as previously described. FIG. 4 shows a form to be completed by business members as part of the registration process.

The spatial marketplace system allows suppliers to limit the number of requests for offers to which they will respond in a specified time frame. This is particularly relevant where the system is generating automated responses to requests for offers on behalf of a supplier. For instance, a supplier may estimate that it typically receives a response to 20% of offers generated in response to requests for offers. The supplier may have capacity to supply 100 units per week. Therefore, the supplier may elect to generate up to 500 offers in any one week period.

Furthermore, suppliers can be selective regarding which requests for offers they will respond to. Although a supplier may deal in a particular type of goods, which is of interest to a member, the supplier may deal only in large quantities of that particular good. For example, a brick manufacturer may not be interested in providing offers to a member who requires a small number of bricks to build a barbeque, but may only be interested in responding to requests for offers for say more than 1,000 bricks.

The spatial marketplace system enables each business to accurately define its unique business catchment area thereby minimising waste and increasing the efficiency and efficacy of the distribution of offers.

It is to be understood that various additions, alterations and/or modifications may be made to the parts previously described without departing from the ambit of the invention.

What is claimed is:

1. A computer implemented method of managing delivery of offers from suppliers to members via a spatial marketplace system including the steps of:
    (a) registering potential customers as members of the spatial marketplace system by recording names and contact details of the members in a database;
    (b) assigning, by a processor, a spatial identifier to each database record, the spatial identifier being sourced from the contact details supplied during a registration process;
    (c) each member nominating one or more attributes corresponding to a commodity in relation to which the member is interested in receiving offers and each member requesting offers the member is interested in receiving;
    (d) each supplier defining a geographic region in which the supplier wishes to do business and nominating one or more attributes corresponding to commodities which the supplier wishes to sell;
    (e) using a spatial identifier location algorithm to identify the database records with spatial identifiers located within the geographical region defined by the supplier;
    (f) using a time nominating component to specify a point in time and a time interval when the member's request for offers will be presented to suppliers; and
    (g) associating, by a processor, a numeric qualifier with one or more attributes relating to the commodity the member is interested in, the numeric qualifiers qualifier specifying a quantity, size, or length of the one or more attributes;
    (h) restricting the delivery of offers from a supplier to members associated with the identified database records which have nominated attributes matching the attributes nominated by the supplier at such time the member has indicated he wishes to receive offers by presenting a request for offers to suppliers; and
    (i) further restricting the delivery of offers to members which have nominated the numeric qualifier for the relevant attribute which matches or falls within the range of the numeric qualifiers nominated by the supplier, and to members whose spatial identifiers are located within the geographical region defined by the supplier.

2. A method according to claim 1, further including the step of accompanying each database record by details of memberships to a third party organization, wherein the third party organization receives a percentage of revenue form the spatial marketplace system in return for introducing their members to the system.

3. A method according to claim 1, further including the step of the member nominating a payment option selected from a menu provided by the system, wherein the delivery of offers is further restricted to members which nominate a payment option matching the payment options accepted by the supplier.

4. A method according to claim 1, wherein each attribute is defined by at least four levels, each consecutive level refining a description of the commodity.

5. A spatial marketplace system for managing delivery of offers from suppliers to members via a spatial marketplace system including:
    A memory storing
        a member database including a plurality of member database records, each record including a member name and a spatial identifier
        an attribute database including commodities to be offered by suppliers to members, each commodity having at least one corresponding unique attribute identifier describing or relating to the commodity;
    a processor that:
        generates a member display interface including a request for offer generation component to enable a member to nominate attributes corresponding to a commodity in relation to which the member is interested in receiving offers from suppliers;
        generates a supplier display interface including a catchment selection component to enable the supplier to select a catchment area in which the offers are to be delivered, and a time nominating component whereby the member can specify a point in time and a time interval when a member's request for offers will be presented to suppliers;
        identifies requests for offers in relation to commodities provided by a supplier and from members associated with a spatial identifier location within the catchment area selected by the supplier;
        associates a numeric qualifier component with one or more attributes relating to the commodity that the member is interested in, the numeric qualifiers qualifier specifying a quantity, size, or length of the one or more attributes;
        restricts the delivery of offers to members which have nominated the numeric qualifier for the commodity, which matches or falls within the range of the numeric qualifiers nominated by the supplier, and to members whose spatial identifiers are located within the catchment area selected by the supplier; and
        delivers the offers to members associated with the identified request for offers.

6. A system according to claim 5, wherein each attribute is defined by at least four levels, each consecutive level refining a description of the commodity.

7. A system according to claim 5, further including an attribute database associated with the system, the attribute database including the commodities to be offered using the system and a corresponding unique attribute identifier which describes or relates to each of the goods or services.

8. A system according to claim 5, wherein the member display interface includes an attribute nominating a component for editing the nominated attributes corresponding to one or more commodities in relation to which the member is interested in receiving offers at a particular time.

9. A system according to claim 5, further including a request for offer editing component to enable the member to edit the nominated attributes corresponding to one or more commodities in relation to which the member is interested in receiving offers at a particular time.

* * * * *